Nov. 10, 1936.  A. MOORHOUSE  2,060,684
MOTOR VEHICLE
Filed Dec. 27, 1926  2 Sheets-Sheet 2
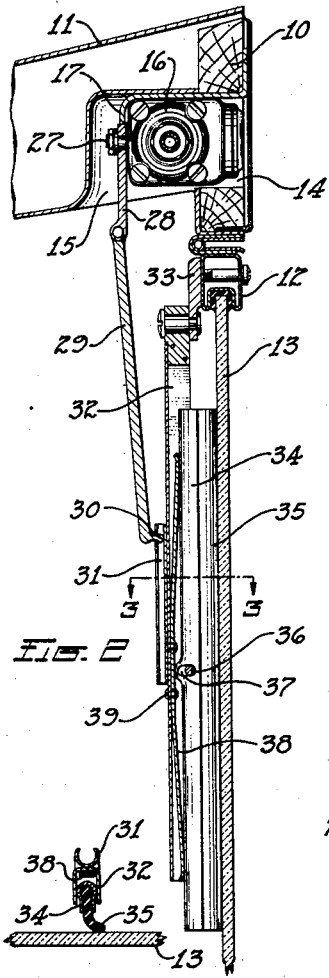
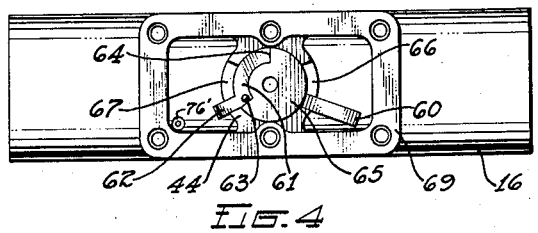
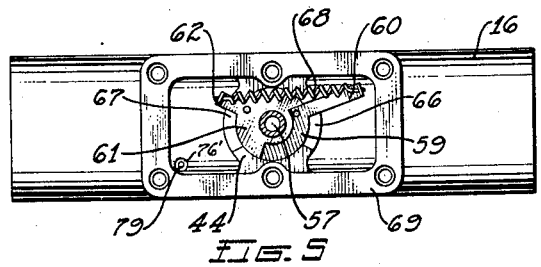
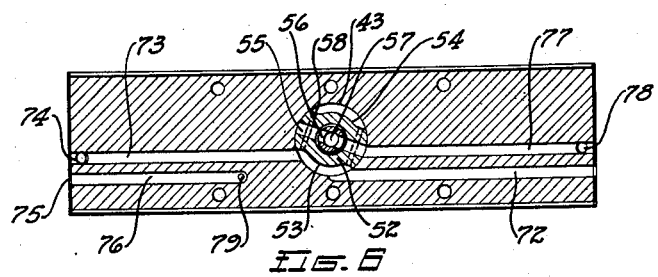
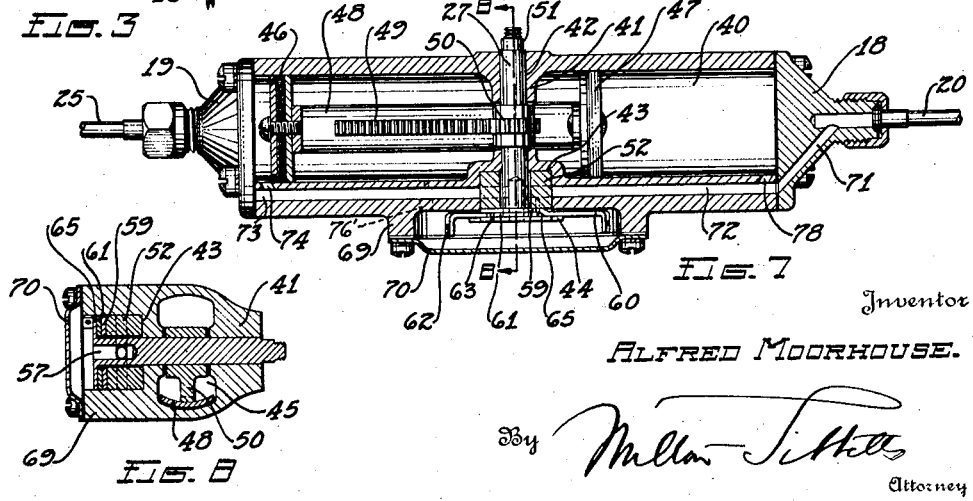
Inventor
ALFRED MOORHOUSE.
Attorney Patented Nov. 10, 1936

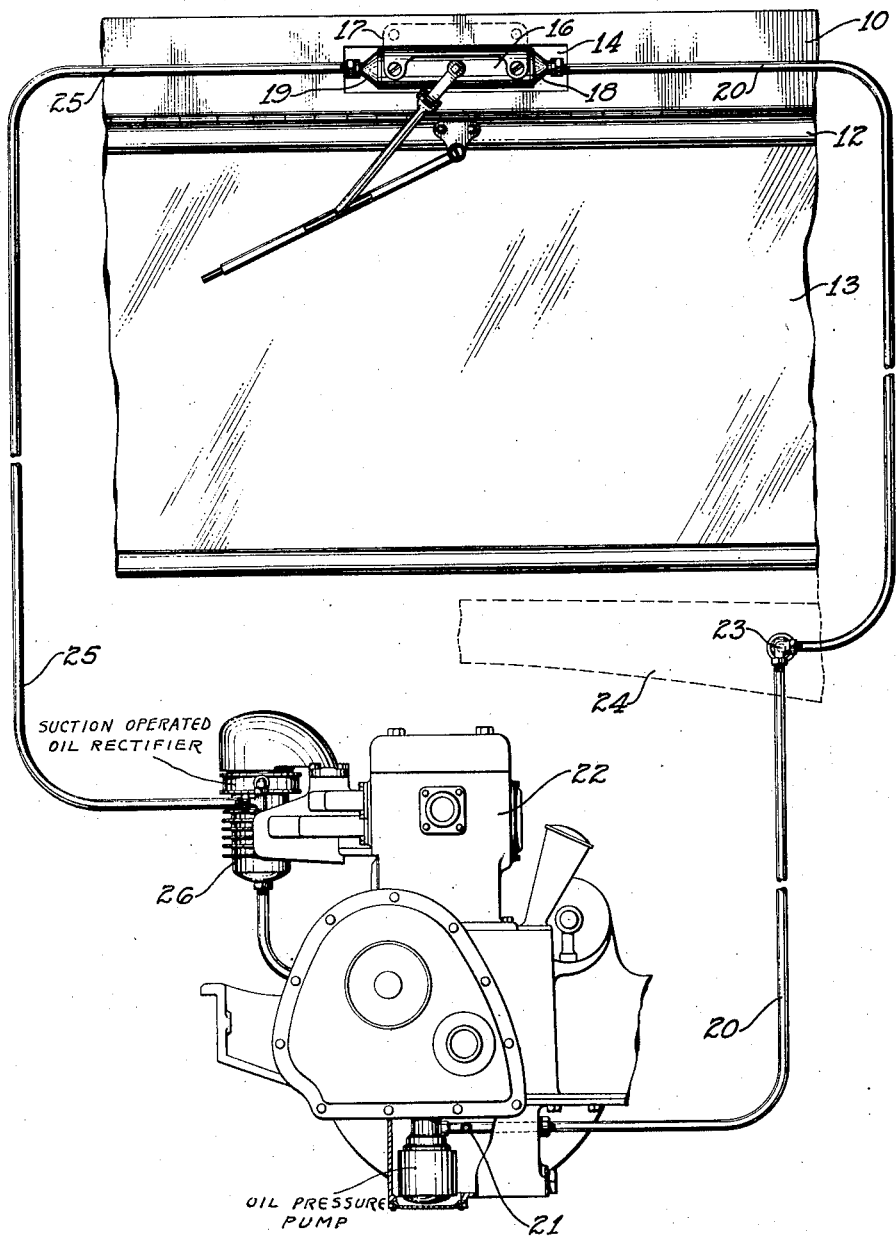

2,060,684

UNITED STATES PATENT OFFICE 2,060,684

MOTOR VEHICLE

Alfred Moorhouse, Detroit, Mich., assignor to Packard Motor Car Company, Detroit, Mich., a corporation of Michigan Application December 27, 1926, Serial No. 157,222

17 Claims. (Cl. 60—52)

This invention relates to motor vehicles and more particularly to windshield cleaners.

One of the objects of the present invention is to provide a motor vehicle windshield wiper with two operating means cooperating to insure continuous movement of the wiper as long as the vehicle engine is running.

Another object of the invention is to provide a windshield cleaner operated by a pressure of oil from the oil feed line of an internal combustion engine and suction from an oil rectifier connected in the oiling system of and operated by the engine.

Another object of the invention is to provide a windshield cleaner having operating means driven by pressure and suction acting concomitantly upon opposed pistons for operating a windshield wiper, with means for regulating and controlling the operating means.

Another object of the invention is to provide means for operating a windshield cleaner comprising a motor operated continuously by pressure and suction exerted upon the respective ends of a reciprocating piston for oscillating an arm having mounted thereupon a windshield wiper.

Other objects of the invention will appear from the following description taken in connection with the drawings, which form a part of this specification and in which:—

Fig. 1 is a comprehensive view, largely in elevation and partly in diagram, illustrating an internal combustion engine, a windshield and a windshield cleaner embodying the various parts that go to make up the present invention.

Fig. 2 is a vertical sectional view of a windshield, its mounting and a front top cross rail of a motor vehicle body with parts broken away, illustrating the invention as applied.

Fig. 3 is a cross sectional view taken on line 3—3, Fig. 2.

Fig. 4 is a side elevation of the cylinder with the cylinder heads and housing cover removed.

Fig. 5 is a similar view with the head of the shaft removed and the valve in the reverse position.

Fig. 6 is a longitudinal sectional view taken through the inlet, exhaust and suction channels.

Fig. 7 is a longitudinal sectional view taken through the complete cylinder assembly, and Fig. 8 is a cross sectional view taken on line 8—8, Fig. 7.

Referring by numerals to the drawings, 10 represents a front cross rail of a motor vehicle body supporting a visor 11 and to which is hinged a frame 12 of a windshield 13. As shown the rail 10 is provided with a slot 14 and the visor 11 is provided with a recess 15 arranged opposite the slot 14 to form a suitable housing for a motor 16, to be hereinafter described.

The motor 16 comprises a cylinder supported within the housing by a bracket 17. Bolted or otherwise mounted upon the respective ends of the cylinder are cylinder heads 18 and 19. The head 18 which contains the intake port of the motor is connected by a pipe line 20, preferably concealed, to the main oil line 21 of an internal combustion engine 22 so that oil will be fed to the motor 16 under pressure, the pressure being regulated by a valve 23 arranged in the pipe line 20 at some suitable location such as the front pillar of a motor vehicle body, or as shown, on an instrument board 24.

The head 19 which contains the exhaust port of the motor, is connected by a pipe line 25, also preferably concealed, to an oil rectifier 26 mounted upon and operated by the internal combustion engine 22. The oil rectifier may be of any suitable or preferred type, such as shown in Patent No. 1,502,921 to Skinner, dated July 29, 1924, and so connected by the pipe line 25 to the motor 16 as to maintain suction through the exhaust port continuously with the operation of the internal combustion engine, except perhaps, when the rectifier dumps, when the suction will be momentarily broken or when the throttle is opened suddenly with the engine running slowly. The dumping of the rectifier will not seriously affect the operation of the motor 16 because it is only momentary, but if the throttle is kept open with the engine running slowly, as on a hill or under other heavy load conditions, the wiper motor would be deprived of its suction power and would not operate at a time when it might be much needed.

It will be observed that continuously with the operation of the internal combustion engine 22 a continuous flow of oil under a pressure, varying with the engine speed within a given pressure range, is fed from the engine oil feed line 21 and is delivered to the intake of the motor 16, and concomitantly therewith there is suction varying substantially inversely as the road load or inversely with the throttle opening at a given speed, through the exhaust of the motor 16 by means of its connection with the oil rectifier 26 which is connected to the intake manifold and is operated by the engine 22. Thus the motor 16 is operated by a force developed by pressure of oil admitted through its intake port and by a force developed by the suction communicating with the exhaust port. This push-and-pull action operates the motor 16 to rock a shaft 27 projecting through the wall of the motor (to be hereinafter described) at an efficient rate of movement in spite of variations in engine speed and throttle adjustment.

The shaft 27 has mounted thereupon a short arm 28 to which is pivoted a secondary arm 29, the connection being effected in a manner to allow movement and adjustment of the windshield without interference. Upon the free end of the secondary arm 29 is a ball stud 30 mounted in a race 31 upon an arm 32 pivoted on a bracket 33 mounted on the frame 12 of the windshield. The arm 32 is formed with a channel or longitudinal slot which receives a clamp 34 having therein a wiper 35 bearing against the windshield 13. The clamp 34 is mounted in the channel of the arm 32 on a pin 36 which passes through a slot 37 in the clamp and allows a rise and fall thereof. In order that the wiper 35 will bear evenly upon the windshield 13, there is interposed between the back of the clamp 34 and the bottom of the channel in the arm 32 a spring 38 secured in position as indicated at 39.

Figs. 4 to 8 both inclusive illustrate the motor 16 which as shown, comprises a cylinder having mounted upon its respective ends the cylinder heads 18 and 19 hereinbefore referred to. The cylinder has a longitudinal chamber 40 divided to provide opposed cylinders by a transverse web 41 bored as at 42 and counterbored to provide a chamber 43 which is surrounded by a flange 44, the bore 42 being transversely slotted as indicated at 45. Mounted to reciprocate in the chamber 40 are corresponding and oppositely disposed pistons 46 and 47 connected by a rod 48 common to both and provided with a rack 49. The rod reciprocates in the slot 45 with the rack thereon engaging a segmental gear 50 upon the shaft 27 journaled in the bore 42 with its respective ends extending through the chamber 43 and the wall of the cylinder as indicated at 51, the shaft being rotated through this connection upon the reciprocation of the pistons.

Mounted to rotate freely on the shaft 27 in the chamber 43 is a valve 52 comprising a cylindrical member having oppositely disposed peripheral grooves 53 and 54 between which is a diametrical bore 55 adapted to register with a diametrical bore 56 in the shaft 27, the bore 56 in the shaft communicating with an axial bore 57 in the end of the shaft. The oppositely disposed ends of the channels or grooves 53 and 54 are connected by passages 58 which allow equalization of the pressure of oil on the valve member 52.

Mounted upon the shaft 27 is a disk 59 keyed or otherwise secured to the valve member 52 and provided with an arm 60 which is slightly bent outwardly from the disc 59. A similar disk 61 is mounted upon the shaft 27 and bears upon the disk 59. The disk 61 is provided with an arm 62 and has a cutaway portion to prevent interference with the arm 60 and a lug 63 adapted to engage a peripheral slot 64 in a flange 65 formed upon the shaft 27 and adapted to retain the valve 52 and the disks 59 and 61 in position. The arm 60 on the disk 59, keyed to the valve, operates in a guide-way 66 which restricts the movement thereof and the arm 62 operates in a guide-way 67 which restricts the movement of the arm 62. The arms 60 and 62 are connected by a spring 68 which snaps across the axis of the shaft 27 and gives a quick rotation to the valve 52. Formed upon the wall of the cylinder 16 around the valve actuating mechanism is a flange 69 upon which is mounted a cover 70 to house the end of the valve and to form a part of the exhaust passage to be hereinafter described.

An intake port 71 communicates with an intake passage 72 which connects with the valve chamber 43 where it registers with the groove 53 in the valve 52 and is connected thereby to a passage 73 having a port 74 communicating with the cylinder 40. Oil under pressure upon being fed through the port 71, passage 72, valve port 53, passage 73 and port 74 enters the cylinder and exerts a pressure upon the piston 46 moving the pistons 46 and 47 to the right, this movement being assisted by suction through the exhaust 75 drawing the discharge through the passage 76 which communicates through a port 76' with the housing over the end of the valve and into which the oil is drawn through the axial bore 57 in the shaft 27, the radial bore 56 in the shaft, the registering radial bore 55 in the valve, the passage 77 and port 78, acting on the piston 47.

Upon completion of the stroke to the right the valve 52 is tripped and the oil under pressure passes through the intake passage 72, the valve port 53, the channel 77 and port 78 into the cylinder to exert pressure upon the piston 47 to move the pistons 46 and 47 to the left. In this movement suction is maintained through the exhaust 75, passage 76, the chamber over the valve, the axial bore 57 and the radial bore 56 in the shaft, the radial bore 55 in the valve, the passage 73 and port 74 to act upon the piston 46, it, of course, being understood that as the pistons reciprocate back and forth the shaft 27 is rocked to actuate the valve and to oscillate the wiper as hereinbefore described.

There is a continuous suction maintained through the port 75 and channel 76 to draw oil from the housing over the valve and arranged at the inner end of the channel 76 is a small aperture 79 communicating with the bore of the cylinder. The aperture 79 might be located in any position leading from the cylinder bore into the housing. Its function is to bleed the cylinder of any oil which might seep in back of the pistons and thereby interfere with the smooth operation of the device.

I have thus shown and described an accessory motor operating mechanism comprising a driving means or engine, a plurality of co-operating engine-actuated energy or power devices, including the manifold or rectifier, and the oil pump; each of the devices being operated from the engine by relatively independent and movable connections. In this instance, the suction producing means is actuated by various parts of the motor, such as the pistons, which are independent of and movable relatively to the oil pressure actuating means which includes a shaft or gear element. Since the oil pump pressure and its speed of operation vary substantially directly as the speed of the engine within certain speed limits and since the suction or operating force transmitted by the rectifier or manifold varies inversely as the engine throttle opening at a given speed, the speed of operation of the windshield wiper or accessory motor, or the operating force applied thereto, will produce more efficient motor operation than when only suction power means is employed as the actuating force, in spite of a variation in engine speeds and loads. Moreover, since the pump will always produce some power, even at minimum speed, the wiper motor is assured of operation when the suction power from the engine manifold fails, as upon sudden opening of the throttle at low engine speed as above pointed out.

While I have shown and described the preferred embodiment of my invention, I wish it to be understood that I do not confine myself to the precise details of construction herein set forth, by way of illustration, as it is apparent that many changes may be made therein, by those skilled in the art, without departing from the spirit of the invention, or exceeding the scope of the appended claims.

Having thus described my invention, what I claim as new and desire to secure by Letters Patent is:

1. A windshield cleaner comprising, in combination, an internal combustion engine, an oil rectifier having a suction chamber and operated by the engine, a motor connected to and between the oil feed line of the engine and the suction chamber of the rectifier, a shaft driven by the motor and a windshield cleaner operated by the shaft.

2. A windshield cleaner comprising, in combination, an internal combustion engine, an oil rectifier having a suction chamber and mounted upon and operated by the engine, a reciprocating motor connected to and between the main oil feed line of the engine and the suction chamber of the rectifier and a windshield cleaner operated by the motor.

3. In a motor vehicle having a lubricating system including a pressure portion and a suction portion, a conduit connecting the pressure portion and the suction portion, and a motor interposed in the conduit between the pressure portion and the suction portion comprising a cylinder and a piston reciprocable therein by the pressure and suction acting concomitantly upon the respective ends thereof.

4. In a motor vehicle having a lubricating system including an oil pressure pump and an oil rectifier having a suction chamber therein, a conduit connecting the pressure pump and the suction chamber of the rectifier, a fluid pressure motor interposed in the conduit between the pressure pump and said suction chamber comprising a cylinder and a piston movable therein by the pressure and suction acting concomitantly upon the respective ends thereof.

5. In a motor vehicle having a lubricating system including a pressure portion and a suction portion, a conduit connecting the pressure portion and the suction portion, a motor interposed in a conduit between the pressure portion and the suction portion comprising a cylinder and a piston reciprocable therein by the pressure and suction acting concomitantly upon the respective ends thereof, and means for alternating the pressure and suction from one side of the piston to the other.

6. In a motor vehicle having a lubricating system including a pressure portion and a suction portion, a conduit connecting the pressure portion and the suction portion of the system, a windshield wiper mechanism interposed between the pressure portion and the suction portion of the conduit, said mechanism comprising a cylinder, a wiper blade actuating piston reciprocable in the cylinder by the pressure and suction acting concomitantly upon the respective ends thereof, and means for alternating the pressure and suction from one end of the piston to the other.

7. In a motor vehicle, the combination of an internal combustion engine, a windshield wiper motor, operating mechanism for the motor comprising a pair of engine operated means creating forces of variable magnitude, one of the means of said pair of means connected with the engine intake manifold and the other of the means of said pair of means including an engine driven pump, and connecting means between said pair of means and said motor, the minimum speed of the engine operating one of the means of said pair of means sufficiently to maintain operation of the motor at any throttle opening.

8. In an engine driven vehicle, the combination with a windshield wiper operating motor, of driving mechanism for the motor comprising an engine having an intake manifold and a pump each independently developing forces of different magnitude, and means connecting the pump and the manifold with the motor, the forces created by said pump and in said manifold being effective to sustain an efficient rate of motor operation during all engine operating conditions.

9. In a motor vehicle, the combination of an internal combustion engine, a windshield wiper motor, and operating mechanism between the engine and the wiper motor comprising an intake manifold actuated power means developing a force varying in magnitude with changes in the engine throttle opening, an engine driven pump capable of developing a force varying in magnitude directly with the engine speed within limits, and means connecting the manifold and the pump with the windshield wiper motor whereby the forces developed thereby are applied to the motor to produce an efficient rate of reciprocating operation thereof at all engine speeds and throttle openings.

10. In an engine driven vehicle, the combination with a windshield wiper operating motor, of engine intake manifold developed suction power means and engine developed and engine speed controlled pressure power means, connected to actuate said motor.

11. In a motor vehicle, the combination of an internal combustion engine, a windshield wiper motor, operating means between the engine and the wiper motor comprising suction means developing a force varying in magnitude with the throttle opening at a given engine speed, an engine driven pump capable of developing a force varying in magnitude directly with the engine speed within limits, and means connecting the suction means and the pump with the windshield wiper motor whereby the forces developed thereby are applied to the wiper motor to produce an efficient rate of operation thereof during all engine operating conditions.

12. In an engine driven vehicle, the combination of a windshield wiper operating motor; engine created suction power means connected to operate the motor, the magnitude of said suction created force varying with varying conditions of operation of the engine; and engine driven pump means connected to operate the motor, the magnitude of the force created by said pump means varying in accordance with engine speed below a certain limit but the minimum magnitude of such pump force being greater than the minimum magnitude of the suction created force.

13. In an engine driven vehicle, the combination with a windshield wiper operating motor, of engine created suction power means connected to operate the motor, the magnitude of the suction created power being variable with different engine operating conditions, and engine driven pump means connected to actuate the motor, the magnitude of the actuating force created by the pump means varying with engine speed but the minimum magnitude of such pump created force being sufficient to continuously actuate the wiper operating motor when the suction created power development is low during some engine operating conditions.

14. In an engine driven vehicle, the combination with a windshield wiper operating motor, of actuating means for said motor comprising a source of engine created suction and a source of engine created pressure developed in accordance with engine speed, and means connecting said sources in a relation to actuate the motor, the pressure development being sufficient to maintain effective motor actuation during engine operating conditions where the suction created is insufficient to efficiently operate said motor.

15. In an engine driven vehicle, the combination with a windshield wiper motor element adapted to be moved back and forth, of driving means for said element comprising the vehicle engine intake manifold in which there is developed a suction force varying in magnitude with engine operating conditions, an engine driven pump creating a force having a minimum magnitude greater than atmospheric pressure during any engine operating condition, and means connecting said manifold and said pump in relation to operate said wiper motor element whereby the engine developed suction and pump forces will serve to actuate the motor element, the minimum force developed by said pump being effective to actuate said element at a rate providing efficient windshield wiping when said suction force is too low for such purpose during some of the engine operating conditions.

16. In a vehicle driven by an internal combustion engine, the combination with the engine thereof and a motor for moving a windshield wiper back and forth, of means for operating said windshield wiper motor comprising two sources of engine developed power, one of said sources creating a variable suction force under different engine operating conditions and the other of said sources being a pump driven in accordance with engine speed, the power developed by said pump being sufficient to operate said windshield wiper motor at an efficient rate of speed when the suction developed by the first mentioned source is low.

17. In a vehicle driven by an internal combustion engine, the combination with the engine thereof and a motor for moving a windshield wiper back and forth, of means for operating said windshield wiper motor comprising two sources of engine developed power, one of said sources connected to the throttle controlled intake manifold of the engine and thereby creating a variable suction force under different engine operating conditions and the other of said sources being a pump driven by the engine and exerting a regulating influence on the operation of the wiper motor, the power developed by said pump being sufficient to operate said windshield wiper motor at an efficient rate of speed when the suction developed by the first mentioned source is low.

ALFRED MOORHOUSE.